United States Patent [19]

Torii et al.

[11] Patent Number: 4,833,325
[45] Date of Patent: May 23, 1989

[54] IMAGE READOUT APPARATUS

[75] Inventors: Shumpeita Torii; Kaoru Tamura, both of Kanagawa, Japan

[73] Assignee: Fuji Photo Film Co., Ltd., Kanagawa, Japan

[21] Appl. No.: 178,815

[22] Filed: Mar. 28, 1988

Related U.S. Application Data

[63] Continuation of Ser. No. 847,390, Apr. 2, 1986, abandoned.

[30] Foreign Application Priority Data

Apr. 3, 1985 [JP] Japan ................................. 60-70701

[51] Int. Cl.$^4$ .......................................... G01N 23/04
[52] U.S. Cl. ................................................. 250/327.2
[58] Field of Search ........................... 250/327.2, 484.1

[56] References Cited

U.S. PATENT DOCUMENTS

| | | | |
|---|---|---|---|
| 4,417,260 | 11/1983 | Kawai et al. | 250/327.2 |
| 4,453,170 | 6/1984 | Arao | 346/160 |
| 4,543,479 | 9/1985 | Kato | 250/327.2 |

Primary Examiner—Carolyn E. Fields
Attorney, Agent, or Firm—Sughrue, Mion, Zinn, Macpeak & Seas

[57] ABSTRACT

An image readout apparatus applies stimulating light emitted from a laser beam source to a stimulable phosphor sheet which stored a radiation image of an object such as a human body to be diagnosed and reads out a radiation image based on light emitted from the stimulable phoshpor sheet upon exposure to the stimulating light. The image readout apparatus includes an image readout mechanism and a casing accommodating the image readout mechanism. Vibro-isolating light shield members are interposed between the image readout mechanism and the casing, which are individually supported on a floor. Vibro-isolating members are also disposed between a conveyor mechanism for delivering the stimulable phosphor sheet and an optical system for applying the stimulating light to the stimulable phosphor sheet. Shocks imposed inadvertently by the operator or the person being diagnosed on the casing, or vibration induced by the conveyor mechanism in operation, is attenuated to a considerable extent while being transmitted to the optical system. Therefore, the optical axis of the stimulating light is prevented from being disturbed with respect to the stimulable sheet, so that the radiation image can be produced highly accurately.

13 Claims, 2 Drawing Sheets

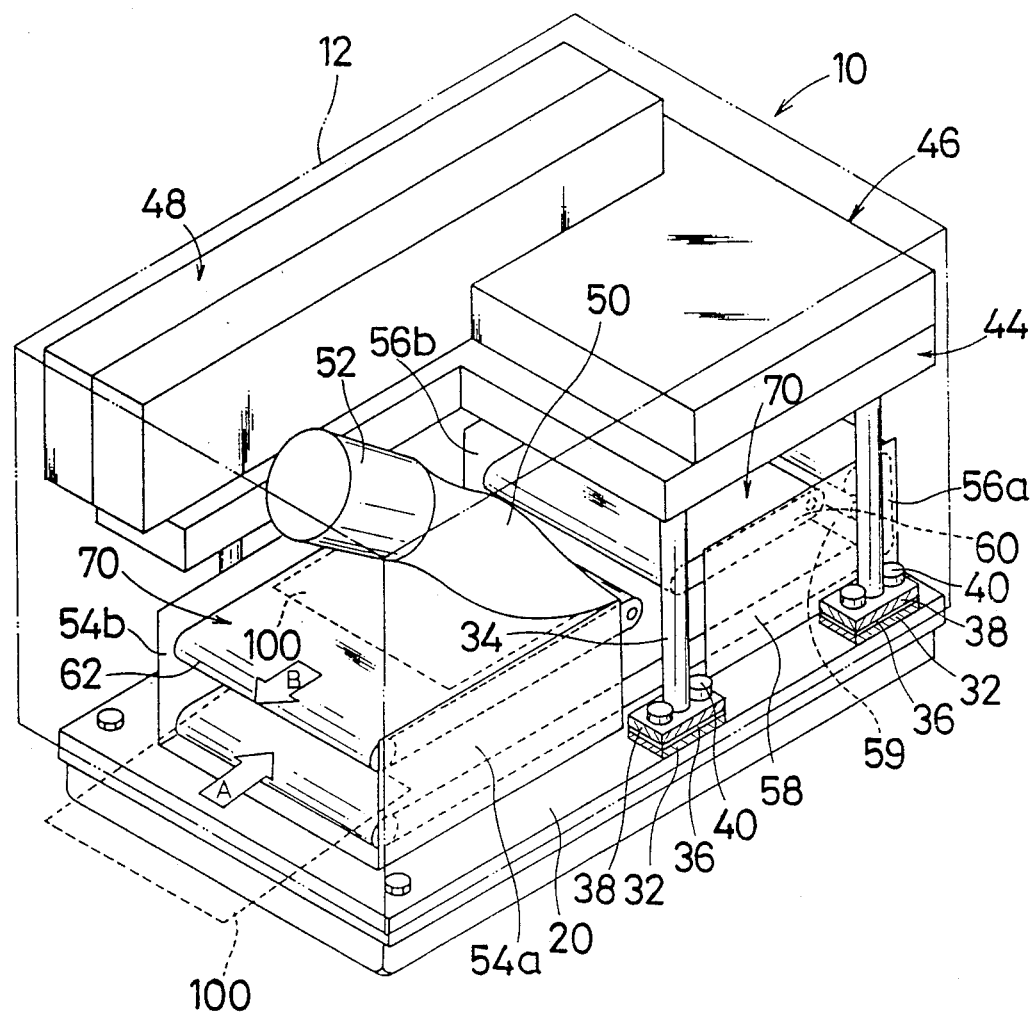

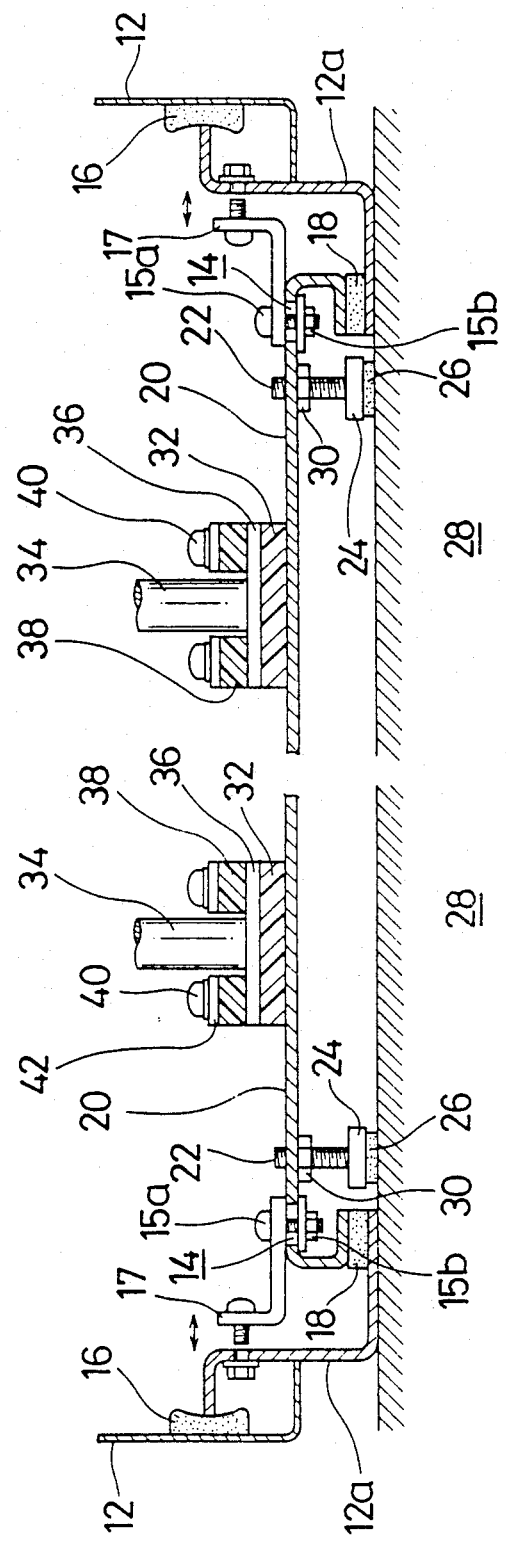

IMAGE READOUT APPARATUS

This is a continuation of application Ser. No. 847,390, filed Apr. 2, 1986, now abandoned.

BACKGROUND OF THE INVENTION

The present invention relates to an image readout apparatus, and more particularly to an image readout apparatus for scanning a stimulable phosphor sheet storing a radiation image thereon with stimulating light to enable the stimulable phosphor sheet to emit light and for reading out the emitted light with a photoelectric conversion means, the image readout apparatus having an optical system isolated from undesirable vibration and arranged to prevent entry of light which would be responsible for noise.

There have recently been put to use systems for recording and reproducing radiation image information of an object by employing a stimulable phosphor. The stimulable phosphor is a phosphor which, when exposed to a radiation such as X-rays, α-rays, β-rays, γ-rays, cathode rays, or ultraviolet rays, stores a part of the energy of the radiation. When the phosphor exposed to the radiation is exposed to stimulating light such as visible light, the phosphor emits light in proportion to the stored energy of the radiation.

In the systems for recording and reproducing radiation images, the radiation image of an object such as a human body is stored in a sheet having a layer of stimulable phosphor (hereinafter referred to as a "stimulable phosphor sheet" or a "phosphor sheet"), and then the stimulable phosphor sheet is scanned with stimulating light such as a laser beam to cause the stimulable phosphor sheet to emit light representative of the radiation image. The emitted light is then photoelectrically detected and converted to produce an image signal that is employed to record the radiation image of the object on a recording medium such as a photosensitive material, or to display the radiation image as a visible image on a display unit such as a CRT.

The aforesaid radiation image recording and reproducing system is disclosed in U.S. Pat. Nos. 4,258,264, 4,276,473, 4,315,318, 4,387,428 and Japanese Laid-Open Patent Publication No. 56-11395, for example.

The system of the type described above is practically advantageous in that it can record images in a much wider radiation exposure range than that of conventional radiographic systems using an X-ray film and an intesifying screen. More specifically, it is known that the light emitted by the stimulable phosphor sheet upon exposure to the stimulating light is proportional in a wide range to the amount of radiation to which the stimulable phosphor sheet has been exposed. Therefore, even when the amount of radiation to which the stimulable phosphor sheet is exposed varies to a large extent under varying imaging conditions, the readout gain can be set to a suitable level to enable the photoelectric conversion means to convert the emitted light to an electric signal for recording or displaying the radiation image. Therefore, the radiation image can be produced irrespective of variations in the amount of exposure to which the stimulable phosphor sheet has been exposed.

After the radiation image stored on the stimuable phosphor sheet has been converted to the electric signal, the electric signal can be processed appropriately for recording a visible image on the recording medium or displaying such a visible image on the display unit. The radiation image thus reproduced is better for diagnostic purpose.

In the radiation image recording and reproducing system, the stimulable phosphor sheet is not used for permanently storing the radiation image, but employed for temporarily holding the radiation image before the image is finally recorded or displayed. Therefore, the stimulable phosphor sheet may recyclically be used for better economy and convenience.

The radiation image recording and reproducing system for such recyclic use of the stimulable phosphor sheet comprises a radiation image recording apparatus for irradiating an object with a radiation and for recording an image thereof on a stimulable phosphor sheet, an image readout apparatus for exposing the stimulable phosphor storing the radiation image to stimulating light to enable the stimulable phosphor sheet to emit light and for photoelectrically detecting the emitted light to convert same to an electric signal, and an erasing apparatus for exposing the stimulable phosphor sheet to erasing light to eliminate any remaining radiation image from the stimulable phosphor sheet thereby to make the latter reusable. The recording apparatus, the readout apparatus, and the erasing apparatus, and the eraser may be assembled as a unitary structure in a single casing, or may be constructed as individual and separate units.

The radiation image readout apparatus has a drawback in that when the readout apparatus is subjected to undesirable vibration at the time of exposing the stimulable phosphor sheet to the stimulating light such as a laser beam, the optical axis of the laser beam scanning the stimulable phosphor sheet is displaced with respect to the stimulable phosphor sheet, with the result that a radiation image cannot be read out with high accuracy. Such undesirable vibration may arise from the operation of a conveyor belt which delivers the stimulable phosphor sheet in the apparatus, or may be produced when the readout apparatus is shocked inadvertently by the person being diagnosed or the operator.

In reading out the image from the stimulable phosphor sheet upon exposure thereof to the stimulating light, it is preferable that the light be emitted from the stimuable phosphor sheet solely by application of the stimulating light. If any stray light entered the readout apparatus, it would also be photoelectrically converted, and no accurate radiation image information of the object could be available.

SUMMARY OF THE INVENTION

It is an object of the present invention to provide an image readout apparatus capable of sufficiently absorbing vibration which may be externally applied or internally induced, for allowing a stimulating laser beam to scan a stimulable phosphor sheet without displacing the optical axis of the laser beam with respect to the stimulable phosphor sheet, so that image of high accuracy can be produced.

Another object of the present invention is to provide an image readout apparatus comprising a casing adapted to be supported on a floor, an optical system housed in the casing for applying a laser beam from a laser beam source as stimulating light to a stimulable phosphor sheet which stores radiation image of an object, a light guide for guiding light emitted from the stimulable phosphor sheet upon exposure to the stimulating light, photoelectric conversion means for converting the light guided by the light guide to an electric signal, and a base panel adapted to be supported on the floor, the base panel supporting the optical system and separate from the casing in vibro-isolating relation thereto.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a perspective view of an image readout apparatus according to the present invention; and FIG. 2 is a fragmentary vertical cross-sectional view of a vibro-isolating structure in the image readout apparatus shown in FIG. 1.

DESCRIPTION OF THE PREFERRED EMBODIMENT

As shown in FIG. 1, an image readout apparatus 10 according to the present invention includes a casing cover 12 which covers an image readout mechanism (described later) of the image readout apparatus 10. As illustrated in FIG. 2, the casing cover 12 includes casing frames 12a resting on a floor 28 and supporting on their upper surfaces vibro-isolating light shield members 18 held against a base panel 20 for shielding the interior of the image readout apparatus 10 against entry of light. The casing cover 12 also includes vertical side walls. First vibro-isolating means is comprised of vibro-isolating members 16 interposed between the vertical side walls of the casing cover 12 and upper horizontal ends of the casing frames 12a. The base panel 20 has threaded holes defined in its horizontal portion. Bolts 22 threaded in the threaded holes, respectively, of the base panel 20 have heads 24 on their lower ends, which are disposed on the floor 28 with vibro-isolating members 26 interposed therebetween. Second vibro-isolating means support the base panel 20 by essentially supporting the base panel on end faces of nuts 30 threaded over the bolts 22, respectively, underneath the base panel 20. The base panel 20 is vertically displaceable by turning the bolts 22 in combination with other members, described later. The base panel 20 also has oblong holes 14 defined in the horizontal portion thereof adjacent to the threaded holes. Angles 17 are mounted on the horizontal portion of the base panel 20 by bolts 15a extending through the oblong holes 14 and threaded in nuts 15b, respectively. The casing 12 and the image readout mechanism can be moved in unison by first loosening the bolts 15a and the nuts 15b and then fastening the angles 17 to the casing frames 12a by bolts, for example.

A third vibro-isolating means is comprised of flat vibro-isolating members 32 made of rubber are disposed on the upper surface of the horizontal portion of the base panel 20, and holders 36 which hold a plurality of legs 34 are mounted on the vibro-isolating members 32, respectively. The holders 36 are sandwiched between the vibro-isolating members 32 and vibro-isolating members 38 on the holders 36. The holders 36 are securely held in position by bolts 40 threaded through the vibro-isolating members 38, the holders 36, and the vibro-isolating members 32, the bolts 40 being kept tightened by respective washers 42 therebeneath.

The legs 34 dampened by the vibro-isolating members 32, 38 extend upwardly from the base panel 20 and support an optical support base 44 (FIG. 1) secured to the upper ends thereof.

A shown in FIG. 1, an optical system 46 is disposed on the optical support base 44 and includes a mirror for reflecting a laser beam emitted from a laser beam source 48, which is disposed on a narrow side of the optical support base 44. The laser beam source 48 contains a mirror (not shown) in its casing for directing the emitted laser beam toward the optical system 46.

A light guide 50 is positioned in the vicinity of the optical support base 44. A photomultiplier 52 is mounted on the upper end of the light guide 50 for converting light from the light guide 50 to an electric signal and applying the electric signal to a display unit or a recording device (not shown). Below the optical support base 44, there is disposed a high-precision conveyor mechanism 70 for delivering a stimulable phosphor sheet when the image thereon is to be read out.

A pair of vertical and parallel plates 54a, 54b and another path of vertical and parallel plates 56a, 56b parallel to the plates 54a, 54b are disposed between the optical support base 44 and the light guide 50, and the base panel 20. A first belt conveyor 58 is disposed between the plates 54a, 54b and also between the plates 56a, 56b for delivering the stimulable phosphor sheet in the direction of the arrow A. The first belt conveyor 58 has an end bent upwardly, adjacent to which a second belt conveyor 60 extends in a return direction opposite to the direction of the arrow A, the second belt conveyor 60 lying between the plates 56a, 56b. The bent end of the first belt conveyor 58 is shaped by a plurality of rollers 59 rotatably held against the bent end of the first belt conveyor 58. Between the plates 54a, 54b, there extends a third belt conveyor 62 lying parallel to and in alignment with the second belt conveyor 60. The belt conveyors 58, 60, 62 are supported by the plates 54a, 54b, 56a, 56b. The belt conveyors 60, 62 jointly constitute the high-precision conveyor mechanism 70 for positioning the stimulable phosphor sheet and delivering same in the direction of the arrow B when a rotative drive source (not shown) is operated.

Operation and advantages of the radiation image readout apparatus thus constructed are as follows:

The stimulable phosphor sheet, designated at 100 in FIG. 1, which has stored a radiation image of an object produced upon exposure to a radiation is fed into the image readout apparatus 10 for reading out the image from the stimulable phosphor sheet 100. Specifically, the stimulable phosphor sheet 100 is delivered in the direction of the arrow A onto the first belt conveyor 58. Since the first belt conveyor 58 is bent upwardly at one end adjacent to the second belt conveyor 60, as described above, the stimulable phosphor sheet 100 is delivered toward the second belt conveyor 60 while being sandwiched between the rollers 59 and the bent end of the first belt conveyor 58. When the stimulable phosphor sheet 100 is fed by the second belt conveyor 60 to reach a position beneath the light guide 50, the stimulable phosphor sheet 100 is moved highly accurately in timed relation to the scanning of the laser beam by the high-precision conveyor mechanism 70. More specifically, a laser beam emitted from the laser beam source 48 is reflected in the optical system 46 to fall as stimulating light on the stimulable phosphor sheet 100, which is scanned by the laser beam as it is moved by the second belt conveyor 60. Upon exposure to the laser beam, the stimulable phosphor sheet 100 emits light commensurate with the radiation image stored thereon.

The emitted light is then guided by the light guide 50 toward the photomultiplier 52 which detects and converts the applied light signal to a corresponding electric signal and applies the electric signal to the display unit or the recording device. After the radiation image has been read out, the stimulable phosphor sheet 100 is fed by the third belt conveyor 62 in the direction of the arrow B so as to be discharged out of the image readout apparatus 10.

When the person being diagnosed or the operator inadvertently hits the casing cover 12, vibration generated by the shock on the casing cover 12 is absorbed by the vibro-isolating light shield members 18 interposed between the casing cover 12 and the base panel 20. Therefore, such shock-induced vibration is not transmitted to the base panel 20 and hence the legs 34 which support the optical system 46. The first belt conveyor 58, the rollers 59, the second belt conveyor 60, and the third conveyor 62 are driven at times to rotate while the image is being read out of the stimulable phosphor sheet 100. Small vibration produced by the rotation of these conveyor members, even if transmitted to the base panel 20 through the plates 54a, 54b, 56a, 56b, is dampened by the vibro-isolating members 32, 38 supporting the legs 34, and thus will not be transmitted to the optical support base 44 and the optical system 46.

As a consequence, the laser beam emitted from the laser beam source 48 is prevented from being disturbed by undesirable vibration. Since the laser beam is applied from the optical system 46 to the stimulable phosphor sheet 100 under stable condition, the image read out of the stimulable phosphor sheet 100 can be highly accurately converted by the photomultiplier 52 into the electric signal.

With the arrangement of the present invention, shocks imposed inadvertently by the person being diagnosed or the operator on the image readout apparatus, and vibration generated by the conveyor system during exposure of the stimulable phosphor sheet to the stimulating light are sufficiently absorbed by the vibro-isolating members, so that accurate image can be obtained. The vibro-isolating light shield members prevent unwanted noise-inducing external light from entering the box-shaped casing of the image readout apparatus. Therefore, the produced image is of higher accuracy. The image readout apparatus of the present invention is of a relatively simple structure, can be manufactured inexpensively, and can be assembled with utmost ease.

While the image readout apparatus is shown as a single unit, the present invention is applicable to a radiation image recording and reproducing system in which an image recording apparatus, an erasing apparatus, and the image readout apparatus of the invention are incorporated together. The casing which supports the optical system may be supported directly on the floor without the intermediary of the vibro-isolating members.

Although a certain preferred embodiment has been shown and described, it should be understood that many changes and modifications may be made therein without departing from the scope of the appended claims.

What is claimed is:

1. An image readout apparatus comprising:
  a casing having means for supporting said casing on a floor;
  an optical system housed in said casing for applying a laser beam from a laser beam source as stimulating light to a stimulable phosphor sheet which stores a radiation image of an object;
  a light guide for guiding light emitted from the stimulable phosphor sheet upon exposure to said stimulating light;
  photoelectric transducer means for converting the light guided by said light guide to an electric signal;
  a base panel having means for supporting said base panel on a floor, said base panel supporting said optical system and being separate from said casing in vibro-isolating relation thereto;
  first vibro-isolating means interposed between said casing and said base panel; and
  conveyor means for delivering the stimulable phosphor sheet toward said light guide, said conveyor means being supported on said base panel, and said optical system being supported on said base panel by a plurality of additional vibro-isolating means.

2. An image readout apparatus according to claim 1 wherein each of said additional vibro-isolating means comprises:
  a first vibro-isolating member disposed on an upper surface of said base panel;
  a flat holder having a vertical leg extending from an upper surface thereof for supporting an optical support base of said optical system;
  a second vibro-isolating member disposed on an upper surface of said holder and surrounding said vertical leg; and
  bolts for securing said holder and first and second vibro-isolating members to the upper surface of said base panel.

3. An image readout apparatus comprising:
  a casing having a casing frame for supporting said casing on a floor;
  an optical system housed in said casing for applying a laser beam from a laser beam source as stimulating light to a stimulable phosphor sheet which stores a radiation image of an object;
  a light guide for guiding light emitted from the stimulable phosphor sheet upon exposure to said stimulating light;
  photoelectric transducer means for converting the light guided by said light guide to an electric signal;
  a base panel having means for supporting said base panel on a floor, said base panel supporting said optical system and being separate from said casing in vibro-isolating relation thereto;
  first vibro-isolating means interposed between said casing and said base panel; and
  fastening means for fastening said base panel to a vertical wall of said casing frame, wherein said base panel and said casing frame are fastened together by said fastening means when moving the image readout apparatus.

4. An image readout apparatus according to claim 3, wherein said base panel has an oblong hole defined therein, said fastening means comprising an angle, a bolt and nut for fixing said angle to said base panel through said oblong hole, and a fastener for fixing said angle to said vertical wall of said casing frame.

5. An image readout apparatus comprising:
  a casing having means for supporting said casing on a floor;
  an optical system housed in said casing for applying a laser beam from a laser beam source as stimulating light to a stimulate phosphor sheet which stores a radiation image of an object;

a light guide for guiding light emitted from the stimulable phosphor sheet upon exposure to said stimulating light;

photoelectric transducer means for converting the light guided by said light guide to an electric signal;

a base panel having means for supporting said base panel on a floor, said base panel supporting said optical system and being separate from said casing in vibro-isolating relation thereto;

first vibro-isolating means interposed between said casing and said base panel; and second vibro-isolating means comprising:

a threaded bolt having a head on one end;

a vibro-isolating member attached to said head for contact with the floor; and a nut adjustably threaded on said bolt and having an upper end face in contact with a lower surface of said base panel for support thereof.

6. An image readout apparatus comprising:

a casing having means for supporting said casing on a floor;

an optical system housed in said casing for applying a laser beam from a laser beam source as stimulating light to a stimulable phosphor sheet which stores a radiation image of an object;

a light guide for guiding light emitted from the stimulable phosphor sheet upon exposure to said stimulating light;

photoelectric transducer means for converting the light guided by said light guide to an electric signal;

a base panel having means for supporting said base panel on a floor, said base panel supporting said optical system and being separate from said casing in vibro-isolating relation thereto;

first vibro-isolating means interposed between said casing and said base panel, wherein said first vibro-isolating means is comprises of first and second vibro-isolating members, and casing frames supported on the floor and independently connected to said casing and said base panel by first and second vibro-isolating members respectively, wherein said casing and base panel are maintained in a separate vibro-isolating relationship with said casing frames.

7. An image readout apparatus comprising:

a casing having means for supporting said casing on a floor;

an optical system housed in said casing for applying a laser beam from a laser beam source as stimulating light to a stimulable phosphor sheet which stores a radiation image of an object;

a light guide for guiding light emitted from the stimulable phosphor sheet upon exposure to said stimulating light;

photoelectric transducer means for converting the light guided by said light guide to an electric signal;

a base panel having means for supporting said base panel on a floor, said base panel supporting said optical system and being separate from said casing in vibro-isolating relation thereto; and means for shielding light between said casing and said base panel.

8. An image readout apparatus according to claim 7, further including conveyor means for delivering the stimulable phosphor sheet toward said light guide, said conveyor means being supported on said base panel, and said optical system being supported on said base panel by a plurality of vibro-isolating means.

9. An image readout apparatus according to claim 8, wherein each of said vibro-isolating means comprises:

a first vibro-isolating member disposed on an upper surface of said base panel;

a flat holder having a vertical leg extending from an upper surface thereof for supporting an optical support base of said optical system;

a second vibro-isolating member disposed on an upper surface of said holder and surrounding said vertical leg; and bolts for securing said holder and first and second vibro isolating members to the upper surface of said base panel.

10. An image readout apparatus according to claim 7, further including fastening means for fastening said base panel to a vertical wall of said casing frame, wherein said base panel and said casing frame are fastened together by said fastening means when moving the image readout apparatus.

11. An image readout apparatus according to claim 10, wherein said base panel has an oblong hole defined therein, said fastening means comprising an angle, a bolt and nut for fixing said angle to said base panel through said oblong hole, and a fastener for fixing said angle to said vertical wall of said casing frame.

12. An image readout apparatus according to claim 7 wherein said means for supporting said base panel include:

a threaded bolt having a head on one end;

a vibro-isolating member attached to said head and disposed in contact with the floor; and a nut adjustably threaded on said bolt and having an upper end face in contact with a lower surface of said base panel for support thereof.

13. An image readout apparatus according to claim 7, further including casing frames supported on the floor and independently connected to said casing and said base panel by first and second vibro-isolating members respectively, wherein said casing and base panel are maintained in a light shielding relationship with said casing frames.

* * * * *